W. H. BROWN.
Horse Rake.
No. 22,482. Patented Jan'y 4, 1859.
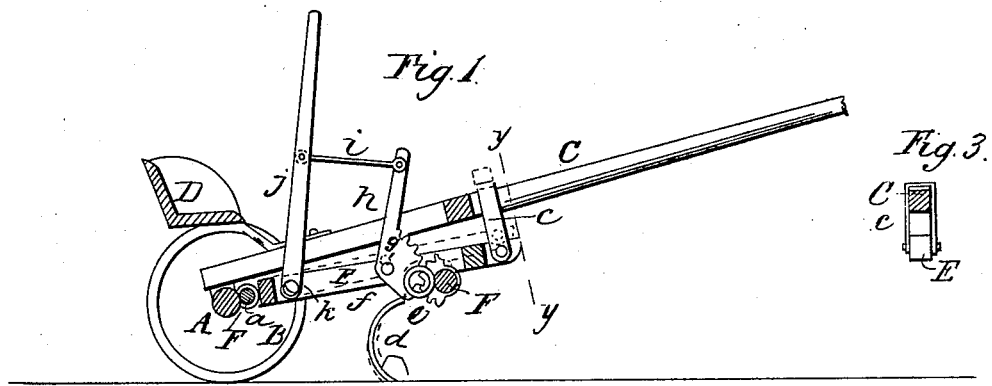
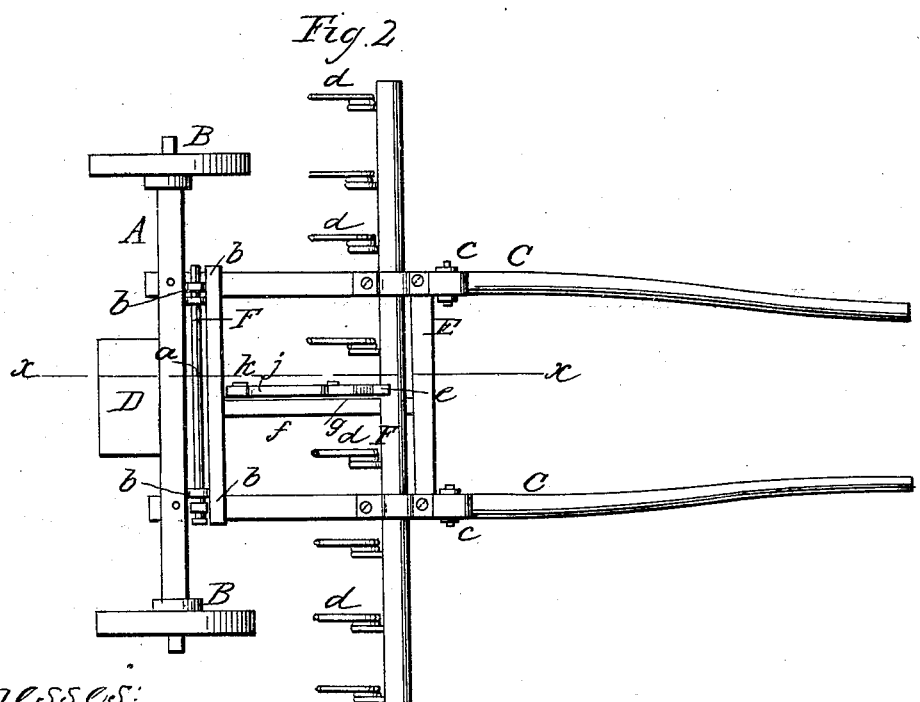

UNITED STATES PATENT OFFICE.

WM. H. BROWN, OF MIDDLETOWN, NEW YORK.

IMPROVEMENT IN HORSE-RAKES.

Specification forming part of Letters Patent No. 22,482, dated January 4, 1859.

*To all whom it may concern:*

Be it known that I, W. H. BROWN, of Middletown, in the county of Orange and State of New York, have invented a new and Improved Horse-Rake; and I do hereby declare that the following is a full, clear, and exact description of the same, reference being had to the annexed drawings, making a part of this specification, in which—

Figure 1 is a side sectional view of my invention, taken in the line $x\,x$, Fig. 2. Fig. 2 is an inverted plan of the same. Fig. 3 is a transverse section of the draft-pole of the same, taken in the line $y\,y$, Fig. 1.

Similar letters of reference indicate corresponding parts in the several figures.

To enable those skilled in the art to fully understand and construct my invention, I will proceed to describe it.

A represents an axle having a wheel, B, at each end, and C represents thills or shafts, which are attached at their back ends permanently to the axle A. To the back part of the thills C the driver's seat D is attached.

E is a rectangular frame, the back part of which is attached by a joint, F, to the axle A. This joint is formed of a rod, $a$, which passes through eyes $b$, attached to the axle A and frame E, as shown clearly in Fig. 2, the frame E being below the thills or shafts C. To the front part of the frame E two metal loops, $c\,c$, are attached, one at each side. These loops encompass the thills or shafts C and serve as guides to the frame, and also determine the length of its up-and-down movement. (See Fig. 3.)

To the front part of the frame E, and to its under side, a rake-head, F', is attached. This rake-head is allowed to turn freely in its bearings, and is provided with wire teeth $d$ of the usual form and construction. To the rake F' a segment-rack, $e$, is secured, and to a longitudinal bar, $f$, in the frame E a toothed sector, $g$, is attached, said sector gearing into the rack $e$. The sector $g$ is provided with an arm, $h$, the upper end of which is connected by a link, $i$, with a lever, $j$, the lower end of which is attached by a fulcrum-pin, $k$, to the bar $f$, the lever $j$ extending up in front of the driver's seat D, as shown clearly in Fig. 1.

The horse is placed between the shafts or thills C C, and attached to the machine in the usual manner. As the machine is drawn along the teeth $d$ rest on the ground and collect or gather the hay or grain, the teeth being allowed to rise and fall to conform to the undulations of the ground, in consequence of the rake-head F' being attached to the front part of the frame E, and the latter allowed to work freely on its joint F. The loops $c\,c$ serve as guides to the frame E and determine the length of its vibration or movement. The driver, from seat D, may at any time actuate the lever $j$ and elevate, through the medium of the sector $g$ and rack $e$, the rake-head F', so that the hay or grain may be readily discharged from the rake, and the latter when free or empty readily adjusted in its former position to be again filled.

In consequence of having the rake-head F' attached to the frame E, as shown, the rake is allowed to play vertically to a certain extent, so that it may conform to the surface of the ground. This movement of the rake-head and frame does not at all affect the gearing $e\,g$ for unloading and setting the rake, and this yielding movement that is allowed the rake adds much to its efficiency, causing it to perform better and preventing the teeth $d$ from being subjected to undue strain, the yielding movement also favoring the horse.

What I claim as new, and desire to secure by Letters Patent, is—

The arrangement and combination of the segment-rack $e$, toothed sector and arm $g\,h$, rod $i$, lever $j$, and frame E, as and for the purpose herein shown and described.

WILLIAM H. BROWN.

Witnesses:
DIMMICK WILKIN,
F. SEYBOLT.